(12) United States Patent
Yang et al.

(10) Patent No.: US 8,469,858 B2
(45) Date of Patent: Jun. 25, 2013

(54) HYBRID VEHICLE WITH DUAL CLUTCH TRANSMISSION

(75) Inventors: Hong Yang, Rochester Hills, MI (US); Shawn H. Swales, Canton, MI (US); Amanda Luedtke, Berkley, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 147 days.

(21) Appl. No.: 13/104,126

(22) Filed: May 10, 2011

(65) Prior Publication Data

US 2012/0289376 A1 Nov. 15, 2012

(51) Int. Cl.
*B60W 10/08* (2006.01)

(52) U.S. Cl.
USPC .......................................................... 477/5

(58) Field of Classification Search
USPC .............................................................. 477/5
See application file for complete search history.

(56) References Cited

U.S. PATENT DOCUMENTS

| | | | |
|---|---|---|---|
| 6,427,549 B1 * | 8/2002 | Bowen | 74/331 |
| 6,490,945 B2 * | 12/2002 | Bowen | 74/339 |
| 6,634,247 B2 * | 10/2003 | Pels et al. | 74/329 |
| 6,887,180 B2 * | 5/2005 | Pels et al. | 477/3 |
| 7,021,410 B2 * | 4/2006 | Hughes | 180/65.25 |
| 7,082,850 B2 * | 8/2006 | Hughes | 74/329 |
| 7,094,176 B2 * | 8/2006 | Budal et al. | 477/5 |
| 7,150,698 B2 * | 12/2006 | Sakamoto et al. | 477/5 |
| 7,166,059 B2 * | 1/2007 | Reitz et al. | 477/5 |
| 7,249,537 B2 * | 7/2007 | Lee et al. | 74/661 |
| 7,272,987 B2 * | 9/2007 | Hughes | 74/340 |
| 7,464,616 B2 * | 12/2008 | Leibbrandt et al. | 74/331 |
| 7,540,823 B2 * | 6/2009 | Kilian et al. | 477/3 |
| 7,604,565 B2 * | 10/2009 | Lee et al. | 477/3 |
| 7,625,311 B2 * | 12/2009 | Dilzer | 477/5 |
| 7,670,256 B2 * | 3/2010 | Winkelmann et al. | 477/5 |
| 7,967,721 B2 * | 6/2011 | Sakamoto et al. | 477/5 |
| 8,251,865 B2 * | 8/2012 | Kaltenbach et al. | 477/5 |
| 8,251,866 B2 * | 8/2012 | Kaltenbach | 477/5 |
| 8,257,223 B2 * | 9/2012 | Kaltenbach et al. | 477/5 |
| 8,272,993 B2 * | 9/2012 | Kaltenbach et al. | 477/8 |
| 2011/0301791 A1 * | 12/2011 | Swales et al. | 701/22 |

* cited by examiner

*Primary Examiner* — Dirk Wright
(74) *Attorney, Agent, or Firm* — Quinn Law Group, PLLC (57) ABSTRACT

A vehicle includes an engine that generates an engine torque and a motor that generates a motor torque. A transmission can receive the engine torque, the motor torque, or both. The transmission includes a first gear set and a second gear set, as well as a first clutch that at least partially engages to transfer torque to the gears in the first gear set and a second clutch that at least partially engages to transfer torque to the gears in the second gear set. A controller can control the engine torque and the motor torque to control a speed of the engine to follow a desired speed profile. The controller can also control the engagement of the first clutch and the second clutch to optimize a desired gear state to minimize system losses.

20 Claims, 5 Drawing Sheets

HYBRID VEHICLE WITH DUAL CLUTCH TRANSMISSION

TECHNICAL FIELD

The invention relates to control of a hybrid vehicle with a dual clutch transmission.

BACKGROUND

Passenger and commercial vehicles may include a transmission that transfers torque from an engine to wheels of the vehicle. A clutch or torque converter may be engaged to transfer torque from the engine to the transmission. The engagement of the clutch may be manual (e.g., actuated by a driver of the vehicle) while the torque converter may automatically transfer torque from the engine to the transmission.

SUMMARY

An example vehicle includes an engine that can generate an engine torque and a motor that can generate a motor torque. The vehicle further includes a transmission configured to receive the engine torque, the motor torque, or both, and has a plurality of gears arranged in a first gear set and a second gear set. The transmission has a first clutch configured to at least partially engage to transfer torque from at least one of the engine and the motor to the gears in the first gear set and a second clutch configured to at least partially engage to transfer torque from the engine and the motor to the gears in the second gear set. Additionally, the vehicle includes a controller configured to control the engine torque and the motor torque to control a speed of the engine to follow a desired speed profile. The controller is further configured to control the engagement of the first clutch and the second clutch to optimize a desired gear state to minimize system losses.

An example method of controlling a hybrid vehicle with a dual clutch transmission includes receiving an acceleration request, determining a clutch state, determining a desired gear state, and generating a first clutch control signal and a second clutch control signal based at least in part on the desired gear state. The method also includes generating an engine torque control signal and a motor torque control signal based at least in part on the desired gear state.

Another example method of controlling a hybrid vehicle with a dual clutch transmission includes receiving a shift command and at least partially disengaging a first clutch in response to receiving the shift command. Moreover, the method includes reducing a motor torque generated by a motor, synchronizing a second clutch, increasing the motor torque, disengaging the first clutch, and at least partially engaging the second clutch.

A hybrid vehicle having the transmission and controller disclosed herein provides greater efficiencies over other types of transmissions used in hybrid vehicles.

The above features and advantages and other features and advantages of the present invention are readily apparent from the following detailed description of the best modes for carrying out the invention when taken in connection with the accompanying drawings.

DETAILED DESCRIPTION

A hybrid vehicle having a dual clutch transmission is disclosed. The vehicle may take many different forms and include multiple and/or alternate components and facilities. While an example vehicle is shown in the Figures, the components illustrated in the Figures are not intended to be limiting. Indeed, additional or alternative components and/or implementations may be used.

Figure 1:
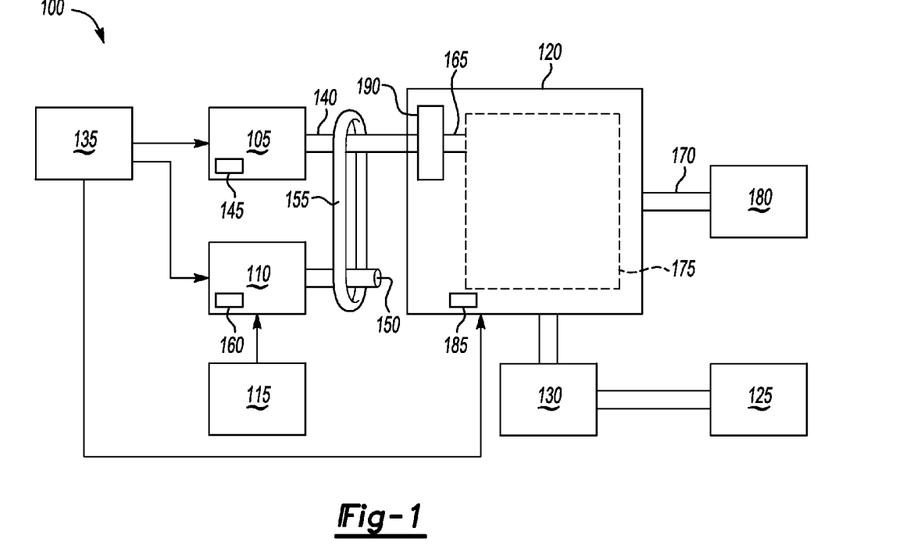
FIG. 1 is a schematic diagram of an example hybrid vehicle having a dual clutch transmission.

The vehicle 100 may include an engine 105, a motor 110, a power source 115, a dual clutch transmission 120, a fluid reservoir 125, and a controller 135. The vehicle 100 may include any passenger or commercial automobile such as a hybrid electric vehicle including a plug-in hybrid electric vehicle (PHEV) or an extended range electric vehicle (EREV), a gas-powered vehicle, a battery electric vehicle (BEV), or the like.

The engine 105 may include any device configured to generate an engine torque by, for instance, burning a mixture of a fossil fuel and air. For instance, the engine 105 may be an internal combustion engine configured to output torque via a crankshaft 140. The operation of the engine 105 may be controlled via an engine control unit 145. The engine control unit 145 may be any device configured to receive command signals and control the operation of the engine 105 based on the command signals received. For instance, the engine control unit 145 may be configured to the amount of fuel and air provided into a chamber of the engine 105, as well as the timing of the combustion of the fuel and air mixture.

The motor 110 may include any device configured to convert electrical energy into rotational motion. For instance, the motor 110 may be configured to receive electrical energy from the power source 115 and rotate an output shaft 150 in accordance with the electrical energy received. The rotation of the output shaft 150 may provide a motor torque to, for instance, the engine 105 and/or the transmission 120. The vehicle 100 may include a belt 155 configured to transfer torque from the motor 110 to the engine 105, and vice versa. Moreover, the motor 110 may be configured to receive the engine torque from the engine 105 in a way that allows the motor 110 to act as a generator. When acting as a generator, the motor 110 may be configured to generate electrical energy that may be stored in the power source 115. The operation of the motor 110 may be controlled by a motor control unit 160. The motor control unit 160 may include any electronic device configured to control, for example, the speed of rotation of the output shaft 150. In one possible implementation, the motor control unit 160 may receive command signals and control the operation of the motor 110 based on the received command signals.

The power source 115 may include any device configured to store electrical energy and output the electrical energy to the motor 110. The power source 115 may be further configured to receive and store electrical energy that may be generated by the motor 110. In one possible implementation, the power source 115 may include one or more batteries. Although not illustrated, an inverter may be operatively disposed between the power source 115 and the motor 110 to convert direct current energy stored by the power source 115 into alternating current energy used to operate the motor 110. Moreover, the inverter may be further configured to convert alternating current energy generated by the motor 110 into direct current energy for storage in the power source 115.

The dual clutch transmission 120 may include any device configured to convert the engine torque, the motor torque, or both, from one torque to another torque. For instance, the transmission 120 may include an input shaft 165, an output shaft 170, a gearbox 175, and a clutch assembly 190. The input shaft 165 may include any device configured to rotate upon receipt of the engine torque and/or the motor torque. The output shaft 170 may include any device configured to provide a torque that may be used to rotate the wheels 180 of the vehicle 100, and thus, propel the vehicle 100. The gearbox 175 may include a plurality of gears that may be configured to convert the engine and/or motor torque provided to the input shaft 165 to the torque provided to the wheels 180 to propel the vehicle 100. In one possible implementation, the gears within the gearbox 175 may be separated into a first gear set 205 and a second gear set 210, as described in greater detail below with respect to FIG. 2. Moreover, as discussed with respect to FIG. 2, the clutch assembly 190 may include two clutches to control the transfer of torque between the crankshaft 140 and the input shaft 165. Further, some components in the transmission 120 may be hydraulically or electrically operated, as described below with respect to FIG. 2. The operation of the transmission 120 may be controlled via a transmission control unit 185.

The fluid reservoir 125 may include any device configured to store a fluid that may be used, for instance, to hydraulically actuate components of the transmission 120. In one possible approach, a pump 130 may be used to pressurize the fluid prior to providing the fluid to the transmission 120.

The controller 135 may include any device configured to control the motor torque and the engine torque that is provided to the transmission 120. For example, the controller 135 may be configured to generate a command signal that causes the motor 110, the engine 105, or both, to rotate at a speed that generates a commanded torque. The controller 135 may be configured to output signals to the engine control unit 145 to control the engine torque and the motor control unit 160 to control the motor torque.

The controller 135 may be further configured to control the operation of one or more components of the transmission 120 by, for instance, generating and transmitting command signals to the transmission control unit 185. For instance, the controller 135 may be configured to selectively engage one or more gears in the gearbox 175 and control the engagement of one or more clutches (see FIG. 2) in the transmission 120.

To control the transmission 120, the controller 135 may be further configured to identify a shift action. For instance, the controller 135 may be configured to determine a gear selection by a driver of the vehicle 100. The gear selection may indicate the driver's intention to place the vehicle 100 in a "park," "reverse," "neutral," or "drive" operating mode. The driver may make such a gear selection using a shift lever operatively disposed in a passenger compartment of the vehicle 100. The controller 135 may identify the gear selection and control the transmission 120 accordingly. Further, when in the "drive" operating mode, the controller 135 may be configured to monitor the speed of the vehicle 100 and the position of an accelerator pedal disposed in the passenger compartment and operated by the driver to determine which gears of the gearbox 175 to engage.

The controller 135 may be configured to cause the engine and/or motor torque to be transferred to the gearbox 175 by at least partially engaging clutches disposed in the transmission 120. The controller 135 may be configured to synchronize one or more of the clutches prior to engaging the clutch, resulting in a smoother transition between gears during gearshifts. Moreover, the controller 135 may be configured to control the operation of the engine 105 and/or the motor 110 during gearshifts. For instance, the controller 135 may be configured to reduce the motor torque by a predetermined amount in addition to controlling the operation of the clutches (e.g., see FIG. 7).

The controller 135 may be configured to use various data when controlling the operation of the engine 105, the motor 110, and/or the transmission 120. As discussed above, the controller 135 may be configured to use the position of the accelerator pedal, a gear selection, and the speed of the vehicle 100. Moreover, the controller 135 may be configured to determine a clutch state (e.g., a launch state, a declutch state, and a drive state, etc.) and command the motor torque and the engine torque based at least in part on the determined clutch state. Further, the controller 135 may be configured to control the engagement of one or more clutches in the transmission 120 based on the determined clutch state.

In one possible approach, the controller 135 may be further configured to control the torque transferred from the engine 105 to the motor 110, and vice versa. For instance, the controller 135 may be configured to cause the motor 110 to transfer torque to the engine 105 to, for instance, reduce the load on the engine 105 to reduce the chance of the engine 105 stalling during a gearshift. The controller 135 may be also configured to cause the engine 105 to transfer torque to the motor 110 to, for example, cause the motor 110 to generate electrical energy for storage in the power source 115.

In general, computing systems and/or devices, such as the controller 135, the engine control unit 145, the motor control unit 160, etc., may employ any of a number of computer operating systems and generally include computer-executable instructions, where the instructions may be executable by one or more computing devices such as those listed above. Computer-executable instructions may be compiled or interpreted from computer programs created using a variety of well known programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of known computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Figure 2:
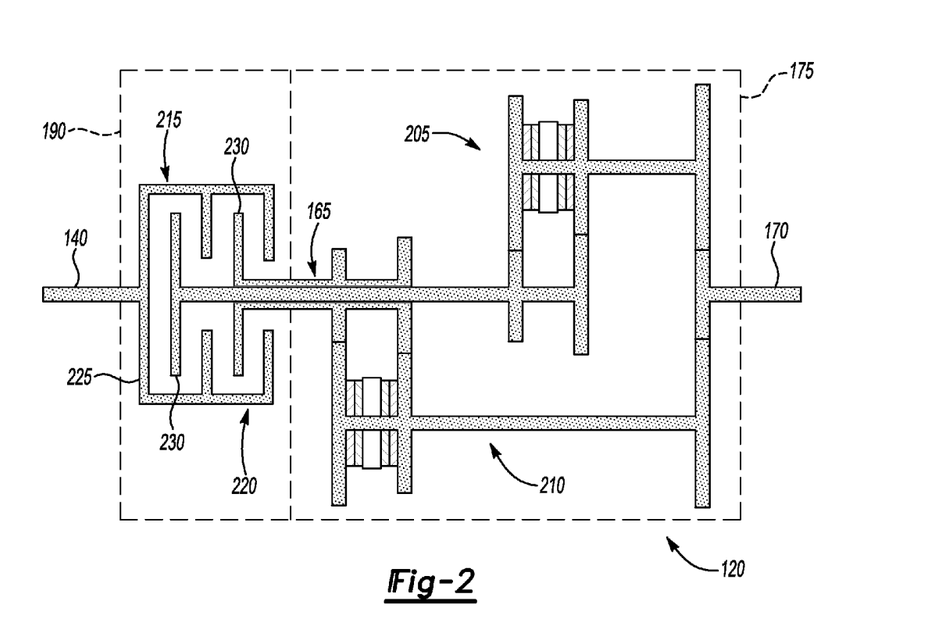
FIG. 2 is a schematic diagram of an example dual clutch transmission that may be used with the hybrid vehicle of FIG. 1.

FIG. 2 illustrates an example dual clutch transmission 120 that may be used in the vehicle 100. As illustrated, the transmission 120 includes the input shaft 165, the output shaft 170, and a gearbox 175 that includes a first gear set 205 and a second gear set 210. Further, the transmission 120 includes a clutch assembly 190 that has a first clutch 215 and a second clutch 220.

The first gear set 205 and the second gear set 210 may include a plurality of gears that are configured to change the rotational speed of the output shaft 170 relative to the input shaft 165. Both the first and second gear sets 205, 210 may include several gears of varying ratios. In one possible approach, the first gear set 205 may include the "even" drive gears (e.g., $2^{nd}$ gear, $4^{th}$ gear, and $6^{th}$ gear) while the second gear set 210 may include the "odd" drive gears (e.g., $1^{st}$ gear, $3^{rd}$ gear, and $5^{th}$ gear). This way, the transmission 120 switches between the first gear set 205 and the second gear set 210 during operation of the vehicle 100. One of the first gear set 205 and the second gear set 210 may include a reverse gear.

The first clutch 215 and the second clutch 220 may each include any device configured to transfer torque from the crankshaft 140 of the engine 105 and/or the output shaft 150 of the motor 110 to the input shaft 165 of the transmission 120. For example, the first clutch 215 and the second clutch 220 may each include a driving mechanism 225 and a driven mechanism 230. The driving mechanism 225 may be operatively connected to the crankshaft 140 and/or the output shaft 150 of the motor 110 while the driven mechanism 230 may be operatively connected to the input shaft 165 of the transmission 120.

The first clutch 215 and the second clutch 220 may be configured to actuate electrically, electromagnetically, electromechanically, hydraulically, etc. For instance, the controller 135 may control a valve that causes pressurized fluid to flow to one or both of the first clutch 215 and the second clutch 220. Alternatively, the controller 135 may generate a command signal and transmit the command signal to the transmission control unit 185. The transmission control unit 185 may cause the pressurized fluid to flow to one or both of the first clutch 215 and the second clutch 220. Upon receipt of the pressurized fluid, the first clutch 215 or the second clutch 220 may at least partially engage (e.g., the driving mechanism 225 may be at least partially engaged with the driven mechanism 230).

When at least partially engaged, the driving mechanism 225 may transfer at least a portion of the engine torque and/or the motor torque to the input shaft 165 of the transmission 120. When partially engaged, the driving mechanism 225 and the driven mechanism 230 may slip relative to one another. That is, the driving mechanism 225 and the driven mechanism 230 may rotate at different speeds. When fully engaged, the driving mechanism 225 and the driven mechanism 230 may rotate at substantially the same speeds. When disengaged, the driving mechanism 225 and the driven mechanism 230 may be free to rotate at different speeds. When the first clutch 215 is at least partially engaged, the engine torque and/or the motor torque is transferred to the first gear set 205, and when the second clutch 220 is at least partially engaged, the engine torque and/or the motor torque is transferred to the second gear set 210.

Figure 3:
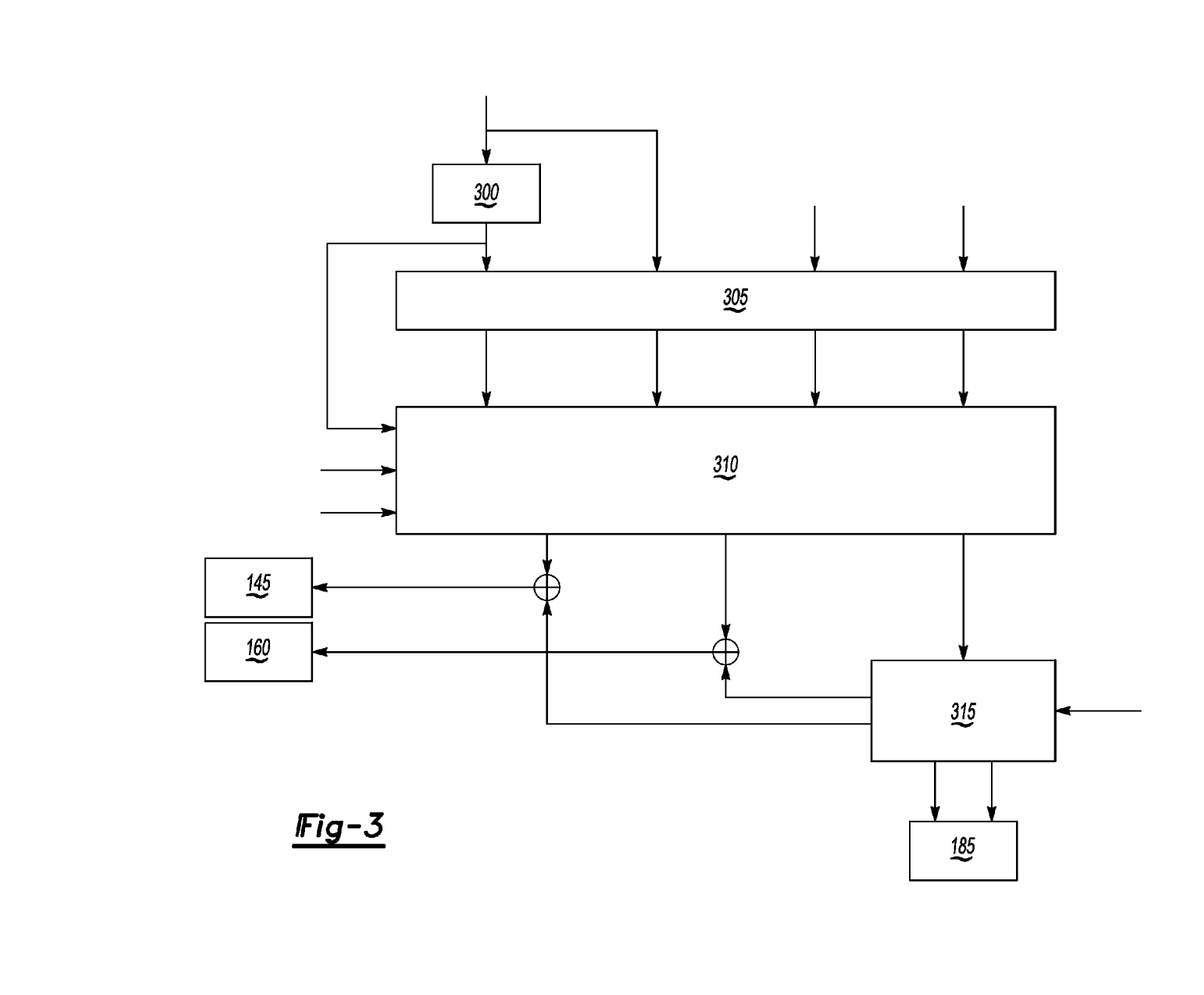
FIG. 3 illustrates an example control architecture that may be used by the vehicle of FIG. 1.

FIG. 3 illustrates an example control architecture that may be used by the controller 135 to control the motor torque, the engine torque, the engagement of the first clutch 215, and the engagement of the second clutch 220.

At block 300, the controller 135 may receive the position of the accelerator pedal. For instance, the driver may press the accelerator pedal in the passenger compartment, and the controller 135 may determine the driver's intent to operate the vehicle 100 based on the way that the driver presses the accelerator pedal. The controller 135 may generate an output torque request based on the position of the accelerator pedal.

At block 305, the controller 135 may receive the position of the accelerator pedal, the output torque request, the current gear, and the speed of the vehicle 100. The controller 135 may use this information to determine a clutch state, such as a launch state, a declutch state, or a drive state. The launch state may indicate that the driver intends to launch the vehicle 100. The declutch state may indicate that one or both of the first clutch 215 and the second clutch 220 should be disengaged. The drive state indicates that the vehicle 100 is in the "drive" operating mode.

At block 310, the controller 135 may receive the output torque request, the speed of the vehicle 100, a state of charge of the power source 115, and the clutch state determined at block 305. With this information, the controller 135 may determine a desired engine torque, a desired motor torque, and a desired gear.

At block 315, the controller 135 may receive the desired gear and determine the amount of torque to transfer across the first clutch 215 and the second clutch 220. The controller 135 may be configured to output one or more command signals to control the engagement of the first clutch 215 and/or the engagement of the second clutch 220. The controller 135 may transmit the command signals to the transmission control unit 185, which may actuate one or more valves, such as one or more solenoid valves, to control the flow of the pressurized fluid to the first clutch 215 and/or the second clutch 220. Alternatively, the controller 135 may transmit the command signals directly to the solenoid valves to control the flow of the pressurized fluid to the first clutch 215 and/or the second clutch 220.

Additionally, at block 315, the controller 135 may further determine an engine torque intervention and a motor torque intervention, which may be used to modify the desired engine torque determined at block 310 and the desired motor torque determined at block 310, respectively, to provide a smoother gear shift. The controller 135 may generate command signals to control the engine 105 to generate the engine torque and the motor 110 to generate the motor torque based on the modified desired engine and motor torque, respectively, and output the command signals to the engine control unit 145 and the motor control unit 160.

Figure 4:
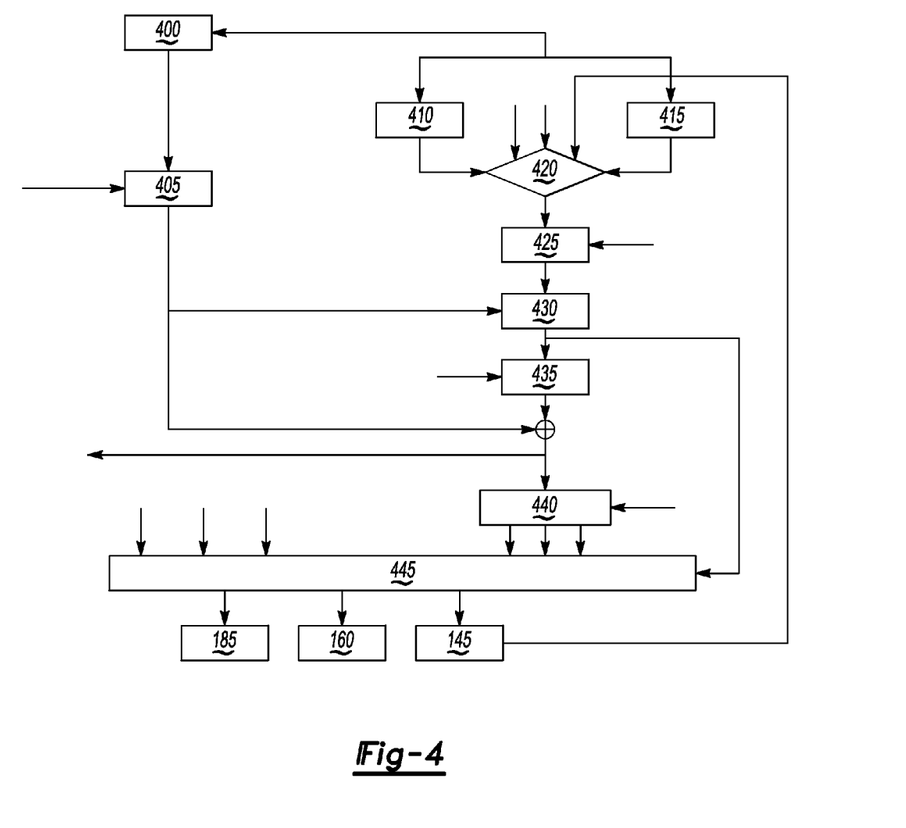
FIG. 4 illustrates an example control architecture that may be used by the vehicle of FIG. 1 during a launch state.

FIG. 4 illustrates an example control architecture that may be used by the controller 135 to control the vehicle 100 during launch.

At block 400, the controller 135 may receive the position of the accelerator pedal that may be operably disposed within the passenger compartment of the vehicle 100. The controller 135 may output a torque output request based on the position of the accelerator pedal.

At block 405, the controller 135 may consider the currently engaged gear of the transmission 120 and the torque output request to determine a desired crankshaft torque. The desired crankshaft torque may be output to block 430 to determine a speed of the engine 105 and used to determine to a crankshaft torque command after block 435.

At block 410, the controller 135 may receive the position of the accelerator pedal and determine an electrical launch k-factor. The k-factor may describe the stall speed of the motor 110 divided by the square root of the motor torque at the stall speed.

At block 415, the controller 135 may receive the position of the accelerator pedal and determine an engine-only or engine on launch k-factor. In this context, the k-factor may describe the stall speed of the engine 105 divided by the square root of the engine torque at the stall speed.

At decision block 420, the controller 135 may determine which k-factor to apply using, for example, the torque output request, the state of charge of the power source 115, the electrical launch k-factor determined at block 410, the engine-on launch k-factor determined at block 415, etc. The k-factor may be determined based on the operating mode of the vehicle 100. For instance, when operating in an electrical-only mode (e.g., only the motor 110 is providing torque to the transmission 120), the controller 135 may select the electrical launch k-factor. If, however, the engine 105 is providing torque to the transmission 120, the controller 135 may select the engine-on launch k-factor.

At block 425, the controller 135 may determine whether to modify the k-factor selected at block 420. That is, if the vehicle 100 is operating in a way such that both the motor 110 and engine 105 are providing a torque to the transmission 120, the controller 135 may determine a blended k-factor to apply. The blended k-factor may be output to block 430.

At block 430, the controller 135 may determine a desired input shaft speed (e.g., the speed of the input shaft 165 of the transmission 120) based on the desired crankshaft 140 speed and the blended or selected k-factor. This implementation described with reference to blocks 410, 415, 420, 425, and 430 is one way to generate the engine speed profile. Other ways of generating the engine speed profile may be used as an alternative to that described above.

At block 435, the controller 135 may receive the current speed of the input shaft 165 and the desired speed of the input shaft 165 determined at block 430 and output an inertial torque, which may be added to the desired crankshaft torque to generate the crankshaft torque command. The crankshaft torque command may be output to control the first clutch 215, the second clutch 220, or both, such that the torque commanded by the crankshaft torque command is transferred through the first clutch 215, the second clutch 220, or both, to the transmission 120.

At block 440, the controller 135 may determine a torque split optimization based on the crankshaft torque command and system losses for each available gear state. The controller 135 may determine a power loss for two or more "drive" gears of the transmission 120 based on the crankshaft torque command and the system losses. System losses include such things as engine losses, transmission and driveline losses, motor and inverter losses, and battery system losses, etc. Moreover, the controller 135 may output a commanded engine torque (e.g., via an engine torque command signal) that may be output to the engine control unit 145 and a commanded motor torque (e.g., via a motor torque command signal) that may be output to the motor control unit 160.

At block 445, the controller 135 may optimize the power loss during launch based on the power loss and commanded engine torque and motor torque determined at block 440. That is, the controller may select the gear state with the commanded engine and motor torque that provides minimal power loss, which is the output from block 440. The controller 135 may output a desired gear, an optimized motor torque, and an optimized engine torque to control the first clutch 215, the second clutch 220, the motor 110, and the engine 105 during launch.

Figure 5:
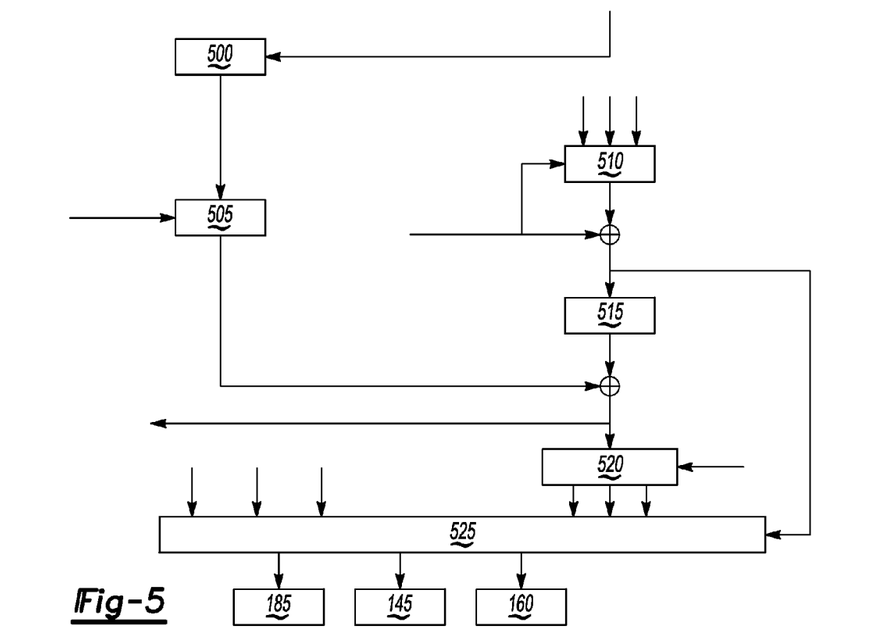
FIG. 5 illustrates an example control architecture that may be used by the vehicle of FIG. 1 during a declutch state.

FIG. 5 illustrates an example control architecture that may be used by the controller 135 to control the operation of the vehicle 100 during a declutch state (e.g., a state where one or both of the first clutch 215 and the second clutch 220 are disengaged).

At block 500, the controller 135 may determine an acceleration request based on a position of the accelerator pedal and generate a torque output request based on the position of the accelerator pedal.

At block 505, the controller 135 may receive the torque output request determined at block 500 along with a gear number indicating the currently engaged "drive" gear. The controller 135 may output a desired crankshaft torque based on the currently engaged gear and the output torque request.

At block 510, the controller 135 may receive an operating state such as an "engine 105 off/electrical spintrol off" state, an "engine 105 off/electrical spintrol on" state, or an "engine 105 on idle" state. At block 510, the controller 135 may further receive a current speed of the input shaft 165 of the transmission 120. The controller 135 may apply the operating state and current speed of the input shaft 165 to a desired clutch slip profile and output a speed. The term "spintrol" may refer to the motor 110 maintaining the speed of an unfuelled engine 105 at a low (e.g., idle) speed to maintain zero lash in the powertrain to avoid a clunk upon a driver accelerator pedal input.

At block 515, the controller 135 may receive the current speed of the input shaft 165 summed with the speed determined based on the desired clutch slip profile at block 510, which may be the desired speed of the input shaft 165. The controller 135 may determine an inertial torque of the motor 110 and/or engine 105 based on the desired speed of the input shaft 165. The inertial torque of the motor 110 and/or engine 105 may be summed with the desired crankshaft torque to generate a crankshaft torque command that may be output to control either the first clutch 215, the second clutch 220, or both.

At block 520, the controller 135 may determine a torque split optimization based on the crankshaft torque command and system losses. The controller 135 may determine a power loss for two or more "drive" gears of the transmission 120 based on the crankshaft torque command and the system losses. Moreover, the controller 135 may output a commanded engine torque (e.g., via an engine torque command signal) that may be output to the engine control unit 145 and a commanded motor torque (e.g., via a motor torque command signal) that may be output to the motor control unit 160.

At block 525, the controller 135 may select the declutch state with the commanded engine and motor torque that provides minimal power loss, which is the output from block 520. The controller 135 may output a desired gear, an optimized motor torque, and an optimized engine torque to control the first clutch 215, the second clutch 220, the motor 110, and the engine 105 during a declutch state.

Figure 6:
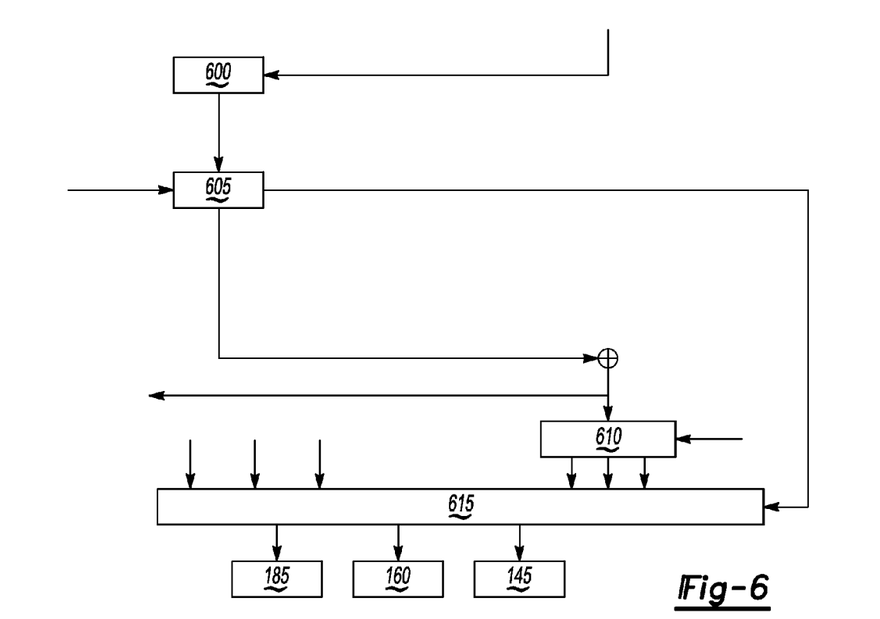
FIG. 6 illustrates an example control architecture that may be used by the vehicle of FIG. 1 during a drive state.

FIG. 6 illustrates an example control architecture that may be used by the controller 135 to control the operation of the vehicle 100 during a drive state.

At block 600, the controller 135 may determine an acceleration request based on a position of the accelerator pedal and output a torque output request based at least in part on the position of the accelerator pedal.

At block 605, the controller 135 may receive the torque output request determined at block 600 along with a gear number indicating the currently engaged "drive" gear. The controller 135 may output a desired crankshaft torque and a desired speed of the input shaft 165 based on the currently engaged gear and the output torque request. The desired crankshaft torque may be used to generate a crankshaft torque command that may be used to control the first clutch 215, the second clutch 220, or both.

At block 610, the controller 135 may determine a torque split optimization based on the crankshaft torque command and system losses. The controller 135 may determine a power loss for two or more "drive" gears of the transmission 120 based on the crankshaft torque command and the system losses. Moreover, the controller 135 may output a commanded engine torque (e.g., via an engine torque command signal) that may be output to the engine control unit 145 and a commanded motor torque (e.g., via a motor torque command signal) that may be output to the motor control unit 160.

At block 615, the controller 135 may select the drive state with the commanded engine and motor torque that provides minimal power loss, which is the output from block 610. The controller 135 may output a desired gear, an optimized motor torque, and an optimized engine torque to control the first clutch 215, the second clutch 220, the motor 110, and the engine 105 during a drive state.

Figure 7:
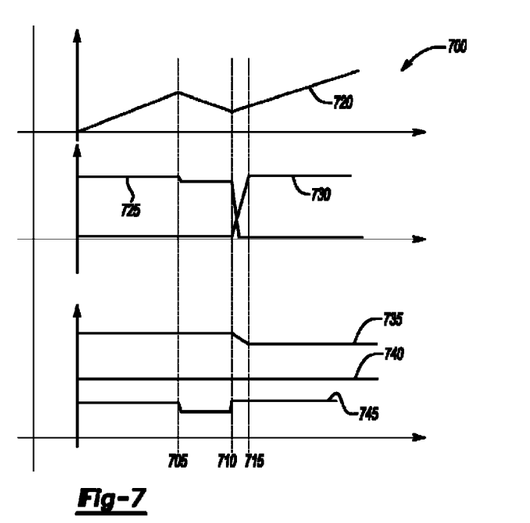
FIG. 7 illustrates an example graph of engine speed, the engagement of a first clutch and a second clutch, an output torque, an engine torque, and a motor torque over a period of time relative to a shift event.

FIG. 7 illustrates an example graph 700 of the speed 720 of the engine 105, the clutch pressure 725 of the off-going clutch, which may be the first or second clutch 215, 220, the clutch pressure 730 of the on-coming clutch, which may be the first or second clutch 215, 220, and the output torque 735, the engine torque 740, and the motor torque 745 at various periods of time (e.g., time 705, 710, and 715) relative to a shift event.

Prior to time 705, the first clutch 215 may be engaged, the speed 720 of the engine 105 may increase, and the engine torque 740 and the motor torque 745 may be combined to provide the output torque 735. The controller 135 may be configured to identify a shift event, which may occur sometime prior to time 705.

A speed phase may begin at time 705. During the speed phase, the pressurized fluid provided to the off-going clutch may be reduced to a critical pressure, causing the off-going clutch to partially disengage (e.g., slip) for a predetermined amount of time as indicated by the line 725. While slipping the off-going clutch, the motor torque is reduced to bring engine speed down to synchronize. Also, the motor torque 745 may be reduced. Before the end of the speed phase, the second clutch 220 may be synchronized and the motor torque 745 may be increased to approximately the same torque as before time 705.

A torque phase may begin at time 710. During the torque phase, the off-going clutch may be disengaged while the on-coming clutch is engaged as indicated by lines 725 and 730. The on-coming clutch may transfer the motor torque 745 and/or the engine torque 740 to different gears than the first clutch 215, resulting in a change in the ratio of the speed of the input shaft 165 to change relative to the speed of the output shaft 170. Therefore, during the torque phase, the output torque 735 of the vehicle 100 (e.g., the torque of the output shaft 170 of the transmission 120) and the speed 720 of the engine 105 may change when the on-coming clutch pressure 730 ramps up. In FIG. 7, the illustrated output torque 735 drops slightly while the speed 720 of the engine 105 rises slightly.

At the conclusion of the torque phase (e.g., at time 715), the on-coming clutch may be fully engaged as indicated by line 730. The speed 720 of the engine 105 continues to rise after time 715 and the output torque 735 will be at a reduced level relative to the output torque 735 during the speed phase (e.g., between times 705 and 710) due to the change in the transmission ratio. The engine torque 740 and the motor torque 740 may remain relatively constant after the torque phase (e.g., after time 715).

Figure 8:
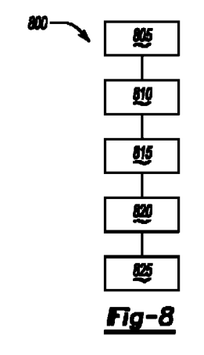
FIG. 8 illustrates an example process that may be implemented by the controller of the vehicle.

FIG. 8 illustrates an example process 800 that may be implemented by the controller 135 to control the operation of the vehicle 100.

At block 805, the controller 135 may receive an acceleration request. For instance, the controller 135 may receive a signal from a sensor operatively disposed on or near the accelerator pedal indicating that the driver intends to increase or decrease the speed of the vehicle 100. For instance, if the driver pushes on the accelerator pedal, the controller 135 may receive a signal indicating that the driver intends for the speed of the vehicle 100 to increase. If the driver releases or lets up on the accelerator pedal, the controller 135 may receive a signal indicating that the driver intends for the vehicle 100 to coast or slow down.

At block 810, the controller 135 may determine a clutch state. The clutch state may be a launch state, a declutch state, a drive state, etc. The clutch state may indicate the engagement and/or disengagement of the first clutch 215, the second clutch 220, or both.

At block 815, the controller 135 may determine a desired gear state. The desired gear state may be a gear that provides an appropriate torque conversion between the input shaft 165 and the output shaft 170 of the transmission 120. The desired gear state may be based on the position of the accelerator pedal determined at block 805 and the clutch state determined at block 810. The desired gear state may be further based on the current gear state and the speed of the vehicle 100.

At block 820, the controller 135 may generate one or more clutch control signals based on the desired gear state. For instance, a first clutch control signal may be used to control the first clutch 215 and a second clutch control signal may be used to control the second clutch 220. That is, the first clutch control signal may be used to command the first clutch 215 to at least partially engage to transfer torque from the motor 110, the engine 105, or both, through the first gear set 205 of the transmission 120. The second clutch control signal may be used to command the second clutch 220 to at least partially engage to transfer torque from the motor 110, the engine 105, or both, through the second gear set 210 of the transmission 120.

At block 825, the controller 135 may generate one or more torque control signals to control the operation of the engine 105 and/or the motor 110 based on the desired gear state. For instance, the controller 135 may generate the engine torque control signal to command the engine 105 to provide the engine torque to the transmission 120. The controller 135 may generate the motor torque control signal to command the motor 110 to provide the motor torque to the transmission 120.

Figure 9:
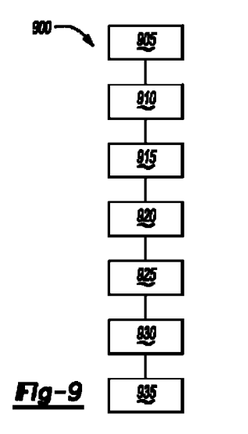
FIG. 9 illustrates another example process that may be implemented by the controller of the vehicle.

FIG. 9 illustrates an example process 900 that may be implemented by the controller 135 to control the operation of the first clutch 215 and the second clutch 220 during a shift action.

At block 905, the controller 135 may receive a shift command. The controller 135 may generate a shift command indicating when to shift gears of the transmission 120 based on, for instance, the position of the accelerator pedal, the current speed of the vehicle 100, the currently engaged gear, etc.

At block 910, the controller 135 may at least partially disengage the first clutch 215 in response to receiving the shift command. When at least partially disengaged, the first clutch 215 may transfer some torque from the engine 105 and/or motor 110 to the transmission 120. However, the driven mechanism 230 of the first clutch 215 may slip relative to the driving mechanism 225.

At block 915, the controller 135 may reduce the motor torque generated by the motor 110. Reducing the motor torque alone or in combination with at least partially disengaging the first clutch 215 may allow the speed of the crankshaft 140 to slow. In one possible approach, the motor torque may be reduced at or about the same time that the controller 135 at least partially disengages the first clutch 215. This example approach at block 915 represents an upshift. For a downshift, the input speed may be increased to synchronize the first clutch 215.

At block 920, the controller 135 may synchronize the second clutch 220. For instance, the controller 135 may cause the driving mechanism 225 and the driven mechanism 230 of the second clutch 220 to rotate at similar speed prior to engaging the second clutch 220.

At block 925, the controller 135 may increase the motor torque. In one possible implementation, the motor torque may be increased prior to synchronizing the second clutch 220.

At block 930, the controller 135 may disengage the first clutch 215. For instance, the controller 135 may fully disengage the first clutch 215 so that the first clutch 215 transfers no torque to the transmission 120 from the engine 105, the motor 110, or both.

At block 935, the controller 135 may at least partially engage the second clutch 220. For instance, the controller 135 may engage the driving mechanism 225 and the driven mechanism 230 of the second clutch 220 so that the second clutch 220 transfers torque to the transmission 120 from the engine 105, the motor 110, or both. In one possible approach, the controller 135 may disengage the first clutch 215 and engage the second clutch 220 at or about the same time. This way, the transmission may always receive torque from the engine and/or motor.

While the best modes for carrying out the invention have been described in detail, those familiar with the art to which this invention relates will recognize various alternative designs and embodiments for practicing the invention within the scope of the appended claims.

The invention claimed is:

1. A vehicle comprising:
an engine configured to generate an engine torque;
a motor configured to generate a motor torque;
a dual-clutch transmission having an input member configured to receive at least one of the engine torque and the motor torque, and having a plurality of gears arranged in a first gear set and a second gear set, wherein the transmission includes a first clutch configured to at least partially engage to transfer torque from at least one of the engine and the motor to the gears in the first gear set and wherein the transmission further includes a second clutch configured to at least partially engage to transfer torque from at least one of the engine and the motor to the gears in the second gear set, with the engine and the motor being connected to the same side of the first and second clutches; and
a controller configured to control the engine torque and the motor torque to control a speed of the engine to follow a desired speed profile, and wherein the controller is further configured to:
calculate an electrical launch k-factor as a function of a stall speed of the motor and a motor torque of the motor at the stall speed;
calculate an engine-on launch k-factor as a function of a stall speed of the engine and an engine torque of the engine at the stall speed;
select one of the electrical launch or the engine-on launch k-factors;
calculate and apply a desired input shaft speed to the input member during a launch of the vehicle as a function of the selected k-factor; and
control the engagement of the first clutch and the second clutch to optimize a desired gear state to minimize system losses after the launch of the vehicle.

2. A vehicle as set forth in claim 1, wherein the controller is configured to identify a shift action after the launch of the vehicle and at least partially disengage the first clutch for a predetermined amount of time in response to identifying the shift action.

3. A vehicle as set forth in claim 2, wherein the controller is configured to disengage the first clutch and engage the second clutch after identifying the shift action.

4. A vehicle as set forth in claim 2, wherein the controller is configured to reduce or increase the motor torque in response to identifying the shift action.

5. A vehicle as set forth in claim 4, wherein the controller is configured to increase the motor torque prior to disengaging the first clutch and engaging the second clutch after identifying the shift action.

6. A vehicle as set forth in claim 1, wherein the controller is configured to at least partially synchronize the second clutch prior to disengaging the first clutch and engaging the second clutch.

7. A vehicle as set forth in claim 1, wherein the controller is configured to determine a clutch state.

8. A vehicle as set forth in claim 7, wherein the controller is configured to determine the clutch state based on at least one of an accelerator pedal position, a current gear selection, and a vehicle speed.

9. A vehicle as set forth in claim 7, wherein the controller is configured to command the motor to generate the motor torque and the engine to generate the engine torque based at least in part on the determined clutch state.

10. A vehicle as set forth in claim 7, wherein the controller is configured to control the engagement of at least one of the first clutch and the second clutch based at least in part on the determined clutch state.

11. A vehicle as set forth in claim 1, wherein the engine is configured to receive the motor torque.

12. A vehicle as set forth in claim 1, wherein the motor is configured to receive the engine torque.

13. A method of controlling a hybrid vehicle with an engine, a motor, and a dual clutch transmission (DCT) having a pair of clutches and an input member, wherein the engine and the motor are connected to the same side of the pair of clutches, the method comprising:
receiving an acceleration request;
determining a clutch state of the DCT;
determining a desired gear state of the DCT;

calculating, via a controller, an electrical launch k-factor as a function of a stall speed of the motor and a motor torque of the motor at the stall speed;

calculating an engine-on launch k-factor as a function of a stall speed of the engine and an engine torque of the engine at the stall speed;

selecting one of the k-factors;

calculating and applying a desired input shaft speed to the input member during a launch of the vehicle as a function of the selected k-factor;

generating, via the controller, a first clutch control signal and a second clutch control signal based at least in part on the desired gear state; and generating, via the controller, an engine torque control signal and a motor torque control signal based at least in part on the desired gear state.

14. A method as set forth in claim 13, wherein the first clutch control signal commands a first clutch to at least partially engage to transfer torque from at least one of a motor and an engine to the transmission.

15. A method as set forth in claim 14, wherein the second clutch control signal commands a second clutch to at least partially engage to transfer torque from at least one of the motor and the engine to the transmission.

16. A method as set forth in claim 13, wherein the engine torque control signal commands an engine to provide an engine torque to the transmission and wherein the motor torque control signal commands a motor to provide a motor torque to the transmission.

17. A method as set forth in claim 13, wherein determining the clutch state includes at least one of determining a launch state, determining a declutch state, and determining a drive state.

18. A method of controlling a hybrid vehicle with an engine, a motor, and a dual clutch transmission (DCT) having a first and a second clutch, wherein the engine and the motor are connected to the same side of the pair of clutches, the method comprising:

calculating, via a controller, an electrical launch k-factor as a function of a stall speed of the motor and a motor torque of the motor at the stall speed;

calculating, via the controller, an engine-on launch k-factor as a function of a stall speed of the engine and an engine torque of the engine at the stall speed;

selecting one of the k-factors;

calculating and applying a desired input shaft speed to the input member during a launch of the vehicle as a function of the selected k-factor;

receiving a shift command after launching the vehicle;

at least partially disengaging the first clutch of the DCT in response to receiving the shift command;

reducing or increasing a motor torque generated by the motor;

synchronizing the second clutch of the DCT;

increasing the motor torque;

disengaging the first clutch; and at least partially engaging the second clutch.

19. A method as set forth in claim 18, wherein increasing the motor torque includes increasing the motor torque prior to synchronizing the second clutch.

20. A method as set forth in claim 18, wherein reducing the motor torque includes reducing the motor torque simultaneously with at least partially disengaging the first clutch.

* * * * *